(12) United States Patent
Blakeman et al.

(10) Patent No.: US 7,448,589 B2
(45) Date of Patent: Nov. 11, 2008

(54) REAR VIEW MIRROR WITH SNAP CONNECTION

(75) Inventors: Rex E. Blakeman, Michigan Center, MI (US); Don S. Rawlings, Caledonia, MI (US)

(73) Assignee: Magna Mirrors of America, Inc., Kentwood, MI (US)

( * ) Notice: Subject to any disclaimer, the term of this patent is extended or adjusted under 35 U.S.C. 154(b) by 100 days.

(21) Appl. No.: 10/522,447

(22) PCT Filed: Jul. 17, 2003

(86) PCT No.: PCT/US03/22196

§ 371 (c)(1),
(2), (4) Date: Jan. 19, 2005

(87) PCT Pub. No.: WO2004/009408

PCT Pub. Date: Jan. 29, 2004

(65) Prior Publication Data

US 2006/0087754 A1    Apr. 27, 2006

Related U.S. Application Data

(60) Provisional application No. 60/319,408, filed on Jul. 19, 2002.

(51) Int. Cl.
*B60R 1/06* (2006.01)
*B60R 1/72* (2006.01)

(52) U.S. Cl. ............... 248/475.1; 248/487; 359/874

(58) Field of Classification Search ......... 359/873–874, 359/877; 248/475.1, 487
See application file for complete search history.

(56) References Cited

U.S. PATENT DOCUMENTS

| | | | | |
|---|---|---|---|---|
| 3,843,236 | A | * 10/1974 | Kurz, Jr. ................. | 359/844 |
| 4,856,885 | A | 8/1989 | Fimeri | |
| 4,881,418 | A | 11/1989 | Fimeri | |
| 5,245,480 | A | * 9/1993 | Polzer .................... | 359/841 |
| 5,293,784 | A | * 3/1994 | Guttenberger et al. ... | 74/425 |
| 5,313,336 | A | 5/1994 | Sakao et al. | |
| 5,331,471 | A | 7/1994 | Gilbert | |
| 5,604,645 | A | * 2/1997 | Weaver .................. | 359/877 |
| 5,721,646 | A | 2/1998 | Catlin et al. | |
| 5,781,353 | A | * 7/1998 | Seubert et al. .......... | 359/841 |
| 6,039,449 | A | * 3/2000 | Dolan et al. ............ | 359/871 |
| 6,050,537 | A | 4/2000 | Fimeri | |

(Continued)

FOREIGN PATENT DOCUMENTS

DE    20117559    1/2002

(Continued)

OTHER PUBLICATIONS http://www.square-columns.com/square-columns.html.*

*Primary Examiner*—Alessandro Amari
*Assistant Examiner*—Mark Consilvio
(74) *Attorney, Agent, or Firm*—McGarry Bair PC (57) ABSTRACT

A plurality of snap-fit fasteners is used to assemble a vehicular mirror assembly, such as attaching a tilt actuator to a mounting frame or the mounting frame to a mirror housing. The fasteners comprise a resilient mounting post having a bulb portion and an adjoining undercut or neck portion with a bore extending coaxially therethrough which is received in a mating aperture in a snap fit communication.

33 Claims, 13 Drawing Sheets

U.S. PATENT DOCUMENTS

| | | |
|---|---|---|
| 6,124,886 A | 9/2000 | DeLine et al. |
| 6,149,287 A | 11/2000 | Pastrick et al. |
| 6,176,602 B1 | 1/2001 | Pastrick et al. |
| 6,224,220 B1 | 5/2001 | Duroux et al. |
| 6,254,242 B1 | 7/2001 | Henion et al. |
| 6,264,338 B1 | 7/2001 | MacFarland et al. |
| 6,276,821 B1 | 8/2001 | Pastrick et al. |
| 6,299,333 B1 | 10/2001 | Pastrick et al. |
| 6,347,872 B1 * | 2/2002 | Brechbill et al. ............ 359/879 |
| 6,406,170 B1 | 6/2002 | Abalos et al. |
| 6,416,208 B2 | 7/2002 | Pastrick et al. |
| 6,439,730 B1 | 8/2002 | Foote et al. |
| 6,443,580 B2 | 9/2002 | Rommel |
| 6,488,382 B1 * | 12/2002 | Mertens ...................... 359/871 |
| 6,712,329 B2 * | 3/2004 | Ishigami et al. .......... 248/475.1 |
| 7,033,033 B2 * | 4/2006 | Ishigami ..................... 359/872 |
| 2002/0130239 A1 * | 9/2002 | Ishigami et al. .......... 248/475.1 |
| 2005/0052764 A1 * | 3/2005 | Centmayer et al. .......... 359/877 |

FOREIGN PATENT DOCUMENTS

| | | |
|---|---|---|
| EP | 0535993 | 4/1993 |
| EP | 1170174 | 1/2002 |
| GB | 2096956 A * | 10/1982 |
| WO | WO 0069685 | 11/2000 |

* cited by examiner

REAR VIEW MIRROR WITH SNAP CONNECTION

CROSS REFERENCE TO RELATED APPLICATIONS

This application claims priority on International Application No. PCT/US03/022196, filed Jul. 17, 2003, which claims the benefit of U.S. Provisional Patent Application 60/319,408, filed Jul. 19, 2002.

BACKGROUND OF THE INVENTION

1. Field of the Invention

The invention relates to an external vehicle mirror assembly and, more particularly, to an external vehicle mirror assembly comprising snap fit connectors for connecting selected components of the vehicle mirror assembly, such as a reflective element tilt actuator mounted to a support frame, or a support frame mounted to a mirror housing or shell.

2. Description of the Related Art

External mirror assemblies are ubiquitous for contemporary motor vehicles and have long been used to aid the driver in operating the vehicle, especially in improving the rearward view of the driver. Selected components of the mirror assemblies must be connected during the assembly process. For example, a tilt actuator assembly used to adjust the mirror to provide a proper field of view is typically mounted to a rigid frame within the mirror assembly housing and is operably connected to a reflective element. The rigid frame is typically mounted within the mirror assembly housing to provide structural support to the housing and connected the mirror assembly to the vehicle. The various connections are typically made with threaded fasteners, such as screws. The fasteners are separate components which an assembler must select in the proper number and properly install in order to properly assemble the mirror.

At times, the correct number of fasteners may not be installed. Also, the fasteners may not be tightened to the proper torque, thereby loosening over time so that the mirror assembly no longer operates satisfactorily. The failure to install the correct number of fasteners or to tighten the fasteners to the proper torque requires a costly replacement of the affected part(s) and can contribute to a reduction in vehicle safety due to operational failure of the mirror assembly.

SUMMARY OF THE INVENTION

In one aspect, the invention relates to an improved vehicular mirror assembly comprising a mirror base adapted to be mounted to a vehicle; a mirror shell mounted to the base and comprising a rearwardly-facing opening; a reflective element mounted within the mirror shell in register with the rearwardly-facing opening; a tilt actuator mounted to at least one of the mirror shell and the base, and to the reflective element for tiltably actuating the reflective element; the improvement comprising: at least one of the mountings between a first component and a second component, the first and second component mountings being between at least one of (1) the base and the mirror shell; and (2) the tilt actuator and the at least one of the mirror shell and the base, comprises a snap-fit connection which securely retains the first component to the second component.

In another aspect, the invention relates to a snap-fit assembly for interconnecting selected components of a vehicular mirror assembly, the components comprising a mirror housing, a mounting frame having at least one of a first mounting aperture, and a tilt actuator assembly having at least one of a second mounting aperture, the snap-fit assembly comprising: at least one of a first mounting stud comprising a first portion having a first diameter and a second portion having a second diameter smaller than the first diameter, the second portion adapted for snap fit communication with the at least one of the first mounting aperture and the first portion adapted for supporting communication with the mounting frame; and at least one of a second mounting stud comprising a first portion having a first diameter and a second portion having a second diameter smaller than the first diameter, the second portion adapted for snap fit communication with the at least one of the second mounting aperture and the first portion adapted for supporting communication with the tilt actuator assembly.

In a further aspect, the invention relates to a vehicular mirror assembly comprising: a mirror housing adapted to enclose a mounting frame and a tilt actuator assembly; and having at least one of a first mounting stud; a mounting frame enclosed within the mirror housing having at least one of a first mounting aperture and at least one of a second mounting stud; a tilt actuator assembly having at least one of a second mounting aperture; and wherein the at least one of a first mounting stud comprising a first portion having a first diameter and a second portion having a second diameter smaller than the first diameter, the second portion adapted for snap fit communication with the at least one of the first mounting aperture and the first portion adapted for supporting communication with the mounting frame; and wherein the at least one of a second mounting stud comprising a first portion having a first diameter and a second portion having a second diameter smaller than the first diameter, the second portion adapted for snap fit communication with the at least one of the second mounting aperture and the first portion adapted for supporting communication with the tilt actuator assembly.

Various embodiments of the invention are also contemplated. The mounting can further comprise an aperture on the first component and a stud on the second component, wherein the stud can be adapted to be snap-fit within the aperture to securely mount the stud within the aperture. The stud can comprise a first portion having a first diameter and a second portion having a second diameter smaller than the first diameter, the second portion is thereby adapted for snap fit communication with the aperture.

The stud can be integrally formed with the to the second component. The second portion of the mounting stud can comprise a neck portion and a bulb end, and the neck portion can have a diameter smaller than the diameter of the bulb end. The bulb end can comprises an annular face having an approximately 45° bevel. The neck portion can comprise a truncated cone inclined approximately 10°. The aperture can comprise an aperture wall inclined approximately 10°. The stud can comprise a bore extending coaxially therethrough. At least one of the first and second components can be made from a material selected from the group consisting of: glass-filled nylon, acetal, polyester, an ABS plastic.

The at least one of a first mounting stud can be integrally attached to the mirror housing. The at least one of a second mounting stud can be integrally attached to the mounting frame. The first portion of the at least one of a first mounting stud can be rigidly attached to the mirror housing. The first portion of the at least one of a second mounting stud can be rigidly attached to the mounting frame. The second portion of the at least one of a first mounting stud can comprise a neck portion and a bulb end, the neck portion having a diameter smaller than the diameter of the bulb end. The bulb end can comprise an annular face having an approximately 45° bevel. The neck portion can comprise a truncated cone inclined approximately 10°.

One of the at least one of a first mounting aperture and the at least one of a second mounting aperture can comprise an aperture wall inclined 10°. One of the at least one of a first mounting stud and the at least one of a second mounting stud can comprise a bore extending coaxially through the one of the at least one of a first mounting stud and the at least one of a second mounting stud.

The mounting bracket can comprise a glass-filled nylon and the mirror housing can comprise acetal. The mounting bracket can comprise a polyester and the mirror housing can comprise an ABS plastic. At least one of the mirror housing and the mounting bracket can be injection molded.

DESCRIPTION OF AN EMBODIMENT OF THE INVENTION

Figure 1:
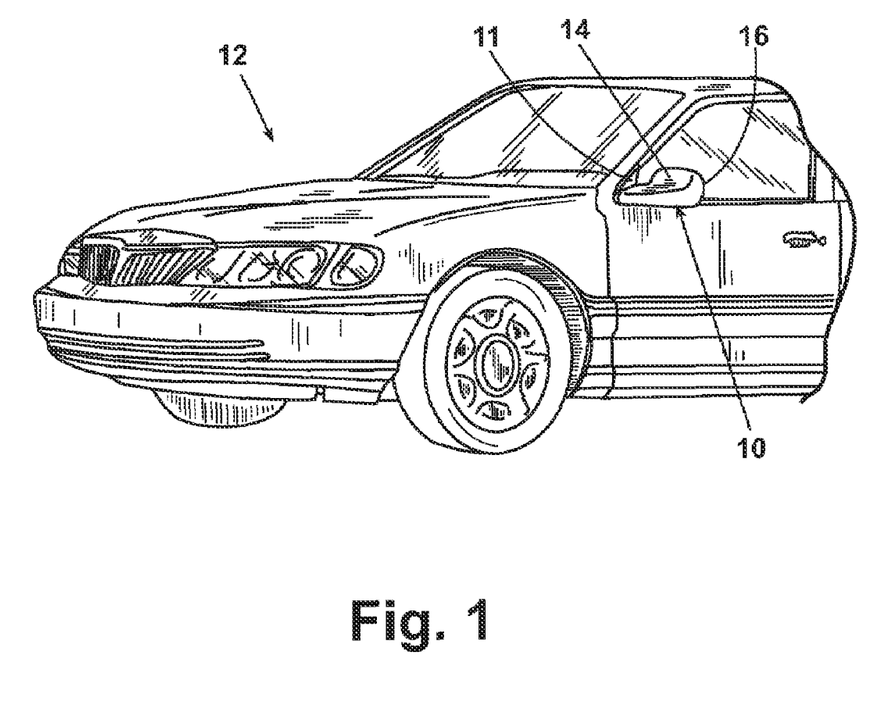
FIG. 1 is a perspective view of a portion of a motor vehicle having an attached mirror assembly according to the invention.
Figure 2:
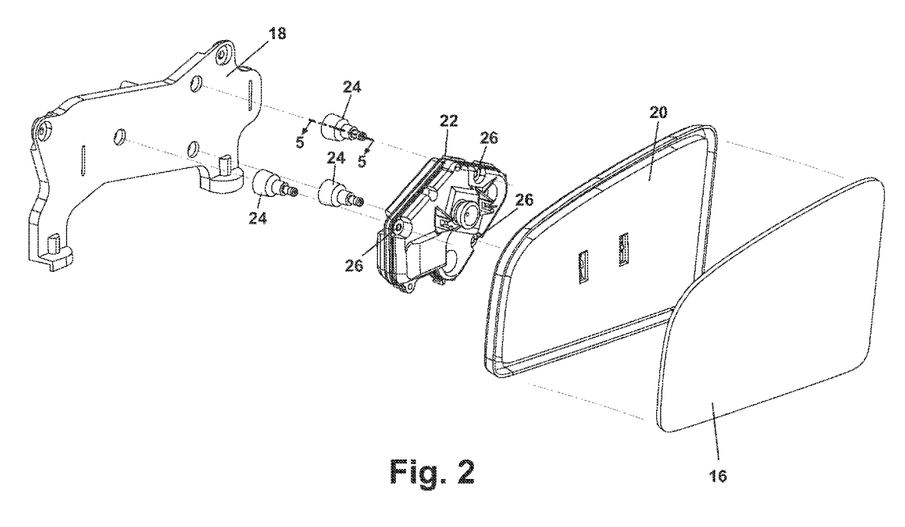
FIG. 2 is an exploded view from the front of a first embodiment of the mirror assembly of FIG. 1 showing the alignment of mounting studs and a tilt actuator.
Figure 3:
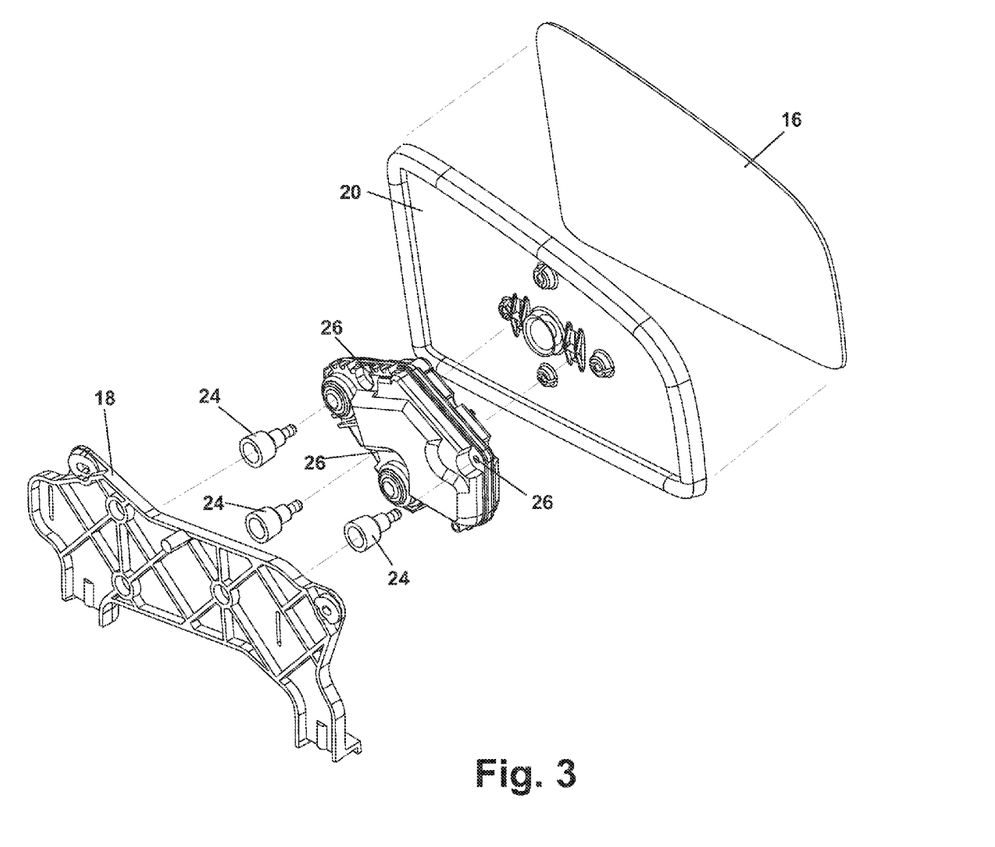
FIG. 3 is an exploded view from the rear of the mirror assembly of FIG. 2.

As shown in FIG. 1, an exterior motor vehicle mirror assembly 10 is mounted in a conventional fashion through a base 11 to a motor vehicle 12. The mirror assembly 10 comprises a mirror housing 14 (also referred to herein as a shell) enclosing a reflective element 16. Referring also to FIGS. 2 and 3, a mounting bracket 18 is fixedly mounted within the mirror housing 14 and supports a mounting panel 20 to which is mounted the reflective element 16. A tilt actuator 22 is operably interposed between the mounting bracket 18 and the mounting panel 20 for vertical and horizontal tilting of the reflective element 16 in order to adjust the field of vision.

Figure 4:
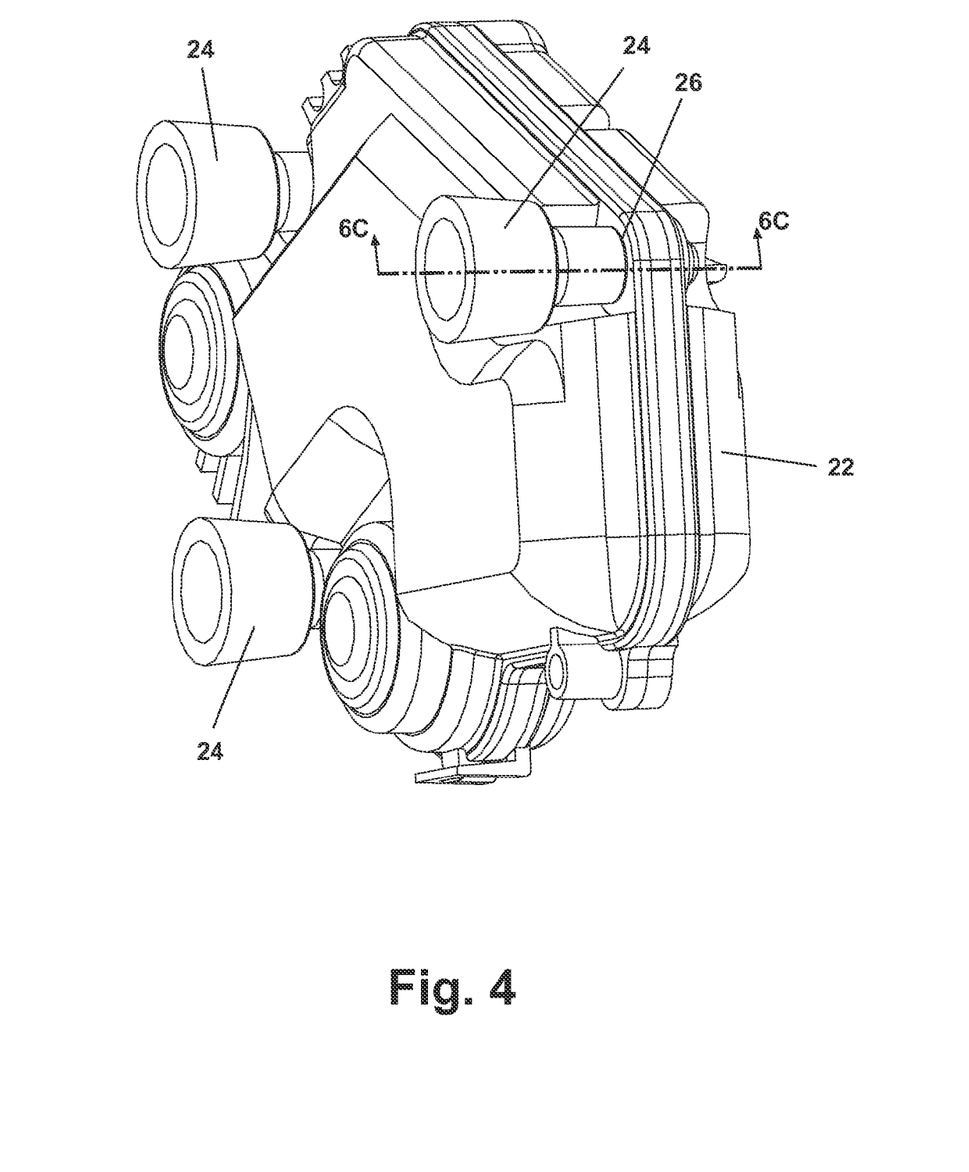
FIG. 4 is a close-up perspective view of the mounting studs installed in the tilt actuator.

According to the invention, the tilt actuator 22 is mounted to the mounting bracket 18 through a plurality of mounting studs 24 inserted through mounting apertures 26 in the tilt actuator 22, as shown in FIG. 4. In a preferred embodiment, the mounting apertures 26 have an internal narrowing taper of approximately 10° in the direction of the arrows shown in FIGS. 6A-C.

Figure 9:
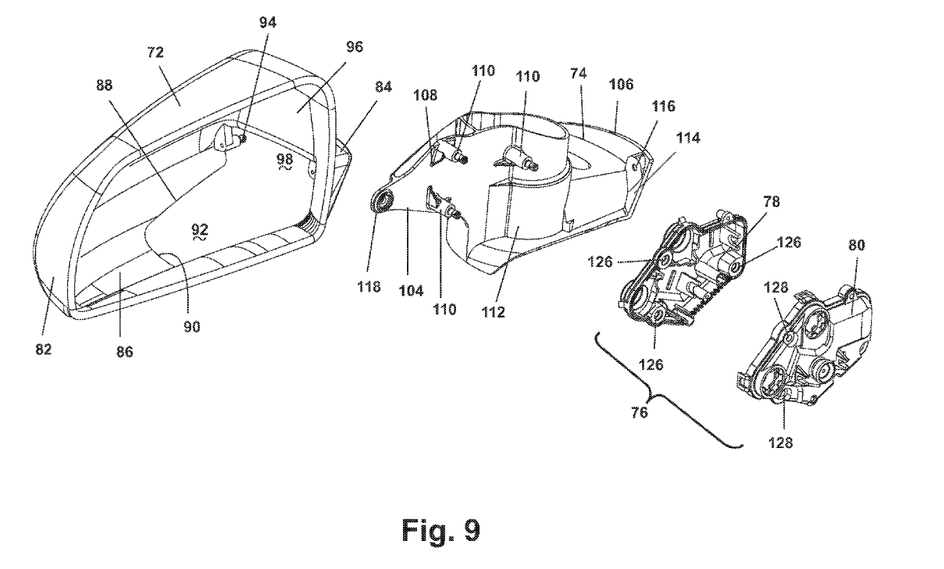
FIG. 9 is a first exploded view of the mirror assembly shown in FIG. 7.
Figure 10:
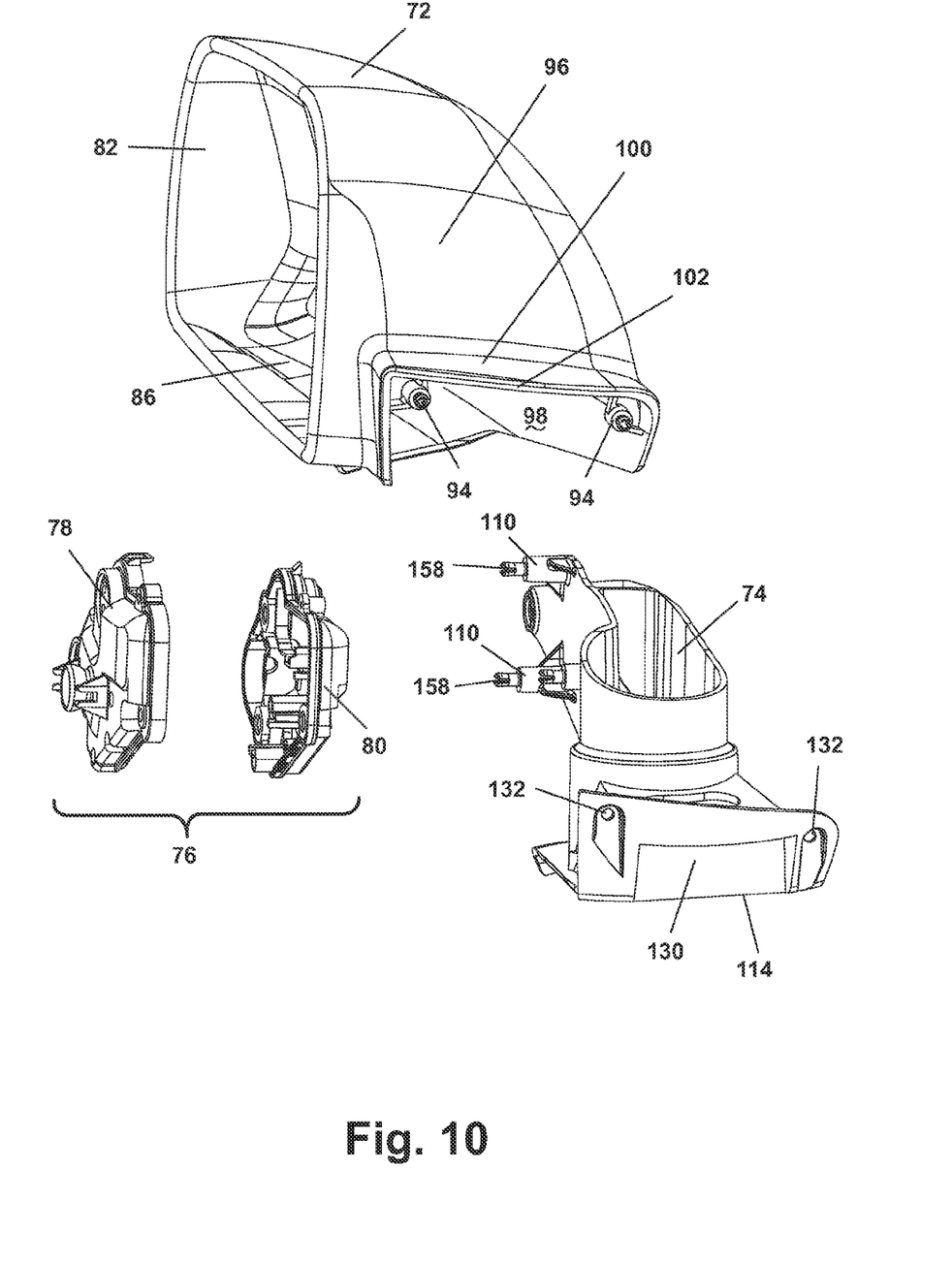
FIG. 10 is a second exploded view of the mirror assembly shown in FIG. 7.
Figure 11:
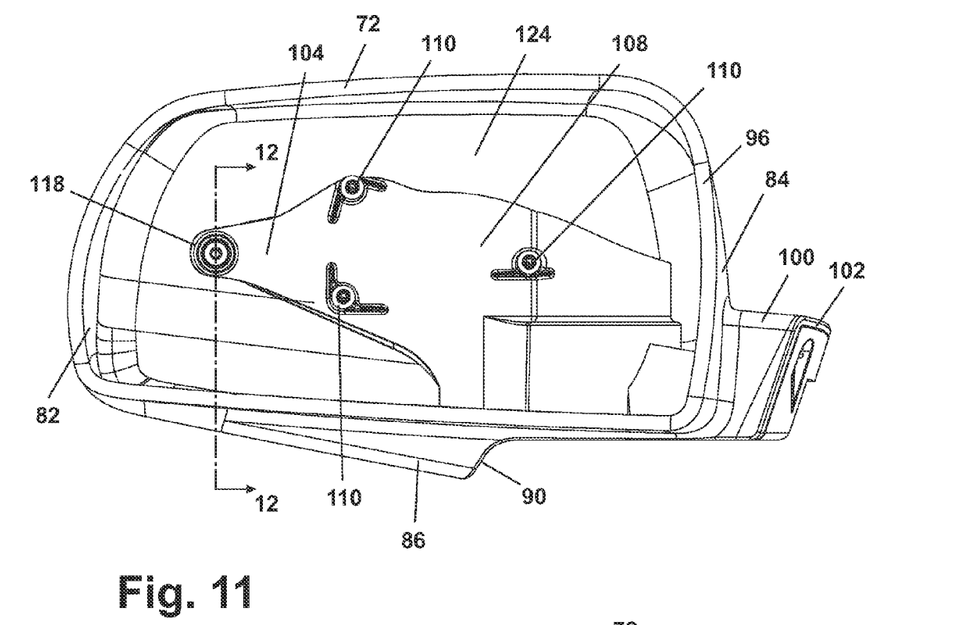
FIG. 11 is a perspective view of the mirror assembly shown in FIG. 7 with the tilt actuator assembly removed for purposes of clarity to show the attachment of the mounting frame within the mirror housing.
Figure 12:
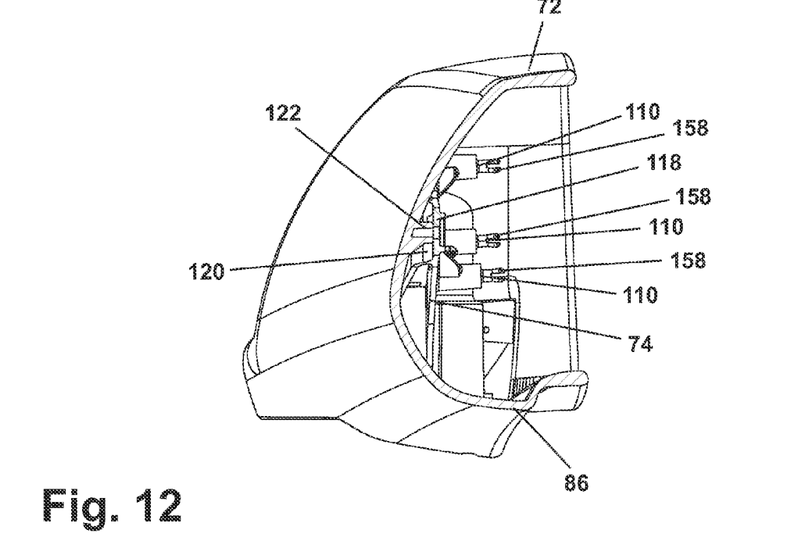
FIG. 12 is a sectional view taken along line 12-12 of FIG. 11.

The mounting studs 24 are fixedly attached to the mounting bracket 18. In the preferred embodiment, the mounting studs 24 comprise part of an injection-molded mounting bracket, as shown in FIGS. 9 and 10. Alternatively, the mounting studs 24 can comprise separate components which are attached to the mounting bracket 18, such as through an adhesive or welding, in order to mate with the mounting apertures 26 in the tilt actuator 22. Alternatively, studs can be attached to a tilt actuator for register with suitable mating apertures in a mounting bracket.

Figure 5:
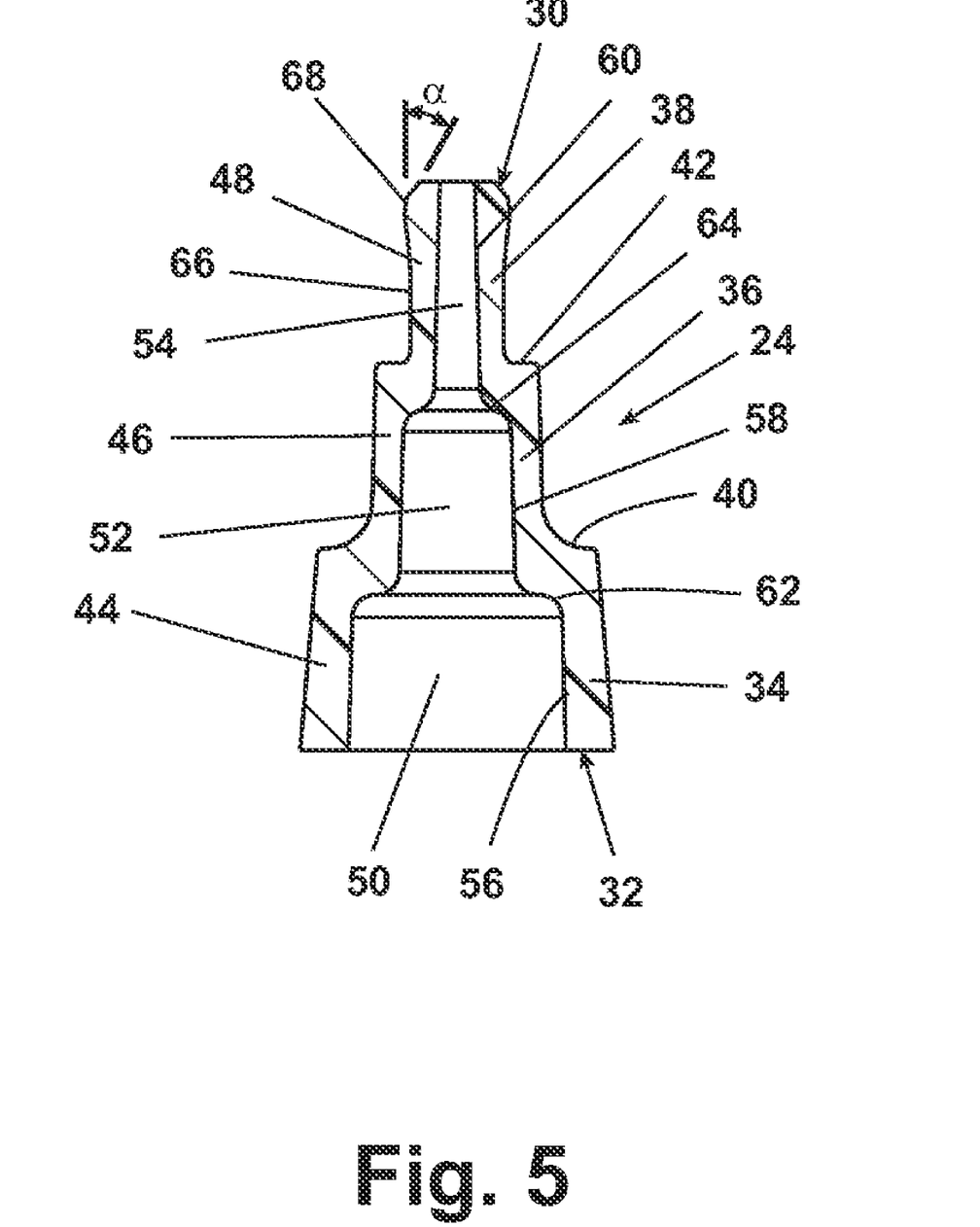
FIG. 5 is a cross-sectional view of a mounting stud of FIG. 2 taken through line 5-5.

Referring now to FIG. 5, the mounting studs 24 comprise a columnar-shaped, stepped body having a first end 30 and a second end 32. The second end 32 comprises an annular major wall 34 forming a generally cylindrical skirt 44 with an annular skirt bore 50 extending therethrough. The first end 30 comprises an annular minor wall 38 forming a generally cylindrical post 48 with an annular post bore 54 extending therethrough. Intermediate the first end 30 and the second end 32 is an annular intermediate wall 36 forming a generally cylindrical collar 46 with an annular collar bore 52 extending therethrough. The major wall 34 transitions inwardly to the intermediate wall 36 through an annular arcuate shoulder 40. The intermediate wall 36 transitions inwardly to the minor wall 38 through an annular shoulder 42. The major wall 34 comprises a cylindrical skirt bore surface 56 to form the skirt bore 50. The intermediate wall 36 comprises a cylindrical collar bore surface 58 to form the collar bore 52. The minor wall 38 comprises a cylindrical post bore surface 60 to form the post bore 54. The skirt bore surface 56 transitions inwardly to the collar bore surface 58 through a first transition surface 62. The collar bore surface 58 transitions inwardly to the post bore surface 60 through a second transitions surface 64. The post 48 comprises a neck portion 66 adjacent the annular shoulder 42 and terminates in a post bulb portion 68 at the first end 30. In a preferred embodiment, the neck portion 66 is provided with a taper of approximately 10° to provide for mating register with the tapered mounting apertures 26. The post bulb portion 68 has an annular inclined lead-in face 69. In a preferred embodiment, the lead-in face 69 is inclined 45° as shown by angle α in FIG. 5. The diameter of the post bulb portion 68 is preferably approximately 10% greater than the diameter of the mounting aperture 26.

Figure 6A:
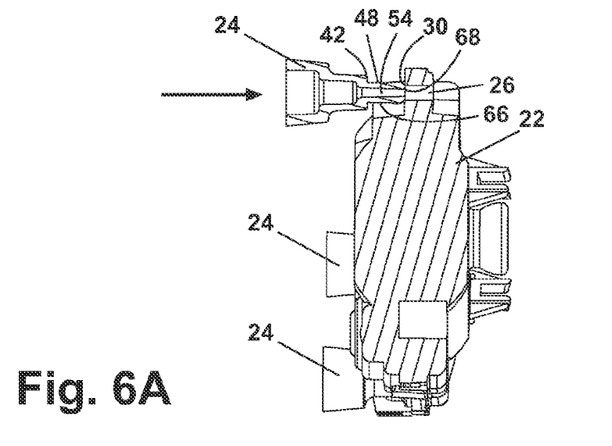
FIGS. 6A-C are a sequence of close-up sectional views of the installation of the mounting studs in the tilt actuator.
Figure 6B:
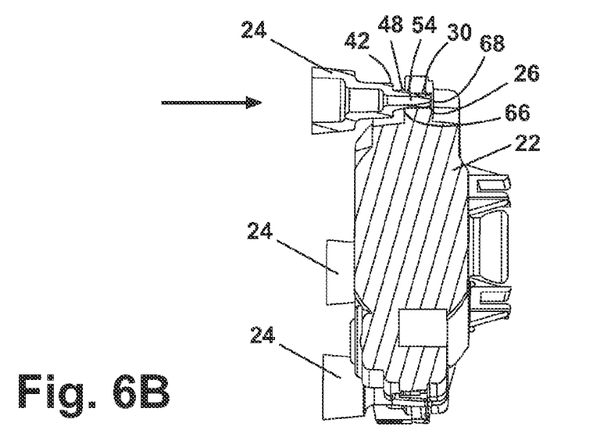
Figure 6C:
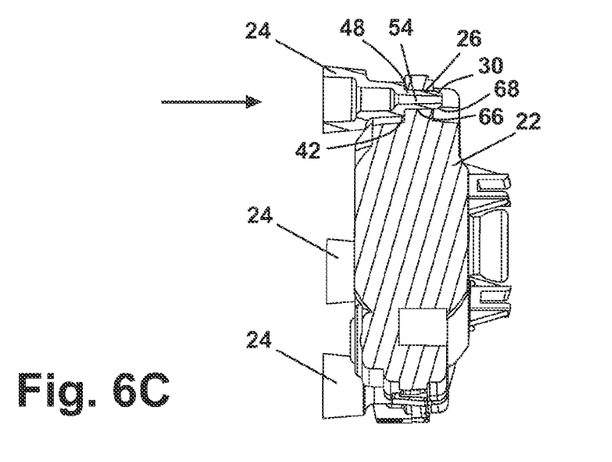

Referring now to FIGS. 6A-C, the tilt actuator 22 is attached to the mounting studs 24 by inserting the posts 48 into the mounting apertures 26. The post bulb portion 68 has a diameter slightly greater than the diameter of the mounting aperture 26, and the neck portion 66 has a diameter essentially equal to the diameter of the mounting aperture 26. As the post bulb portion 68 is inserted into the mounting aperture 26, the post bulb portion 68 resiliently deforms inwardly through constriction of the post bore 54. The mounting stud 24 is inserted through the mounting aperture 26 so that the post bulb portion 68 extends beyond the mounting aperture 26 and the neck portion 66 is retained in the mounting aperture 26. As the post bulb portion 68 passes through the mounting aperture 26, the post bulb portion 68 expands outwardly to assume its original configuration, thereby locking the mounting stud 24 to the tilt actuator 22. The tilt actuator 22 rests against the annular shoulders 42 of the mounting studs 24.

Figure 7:
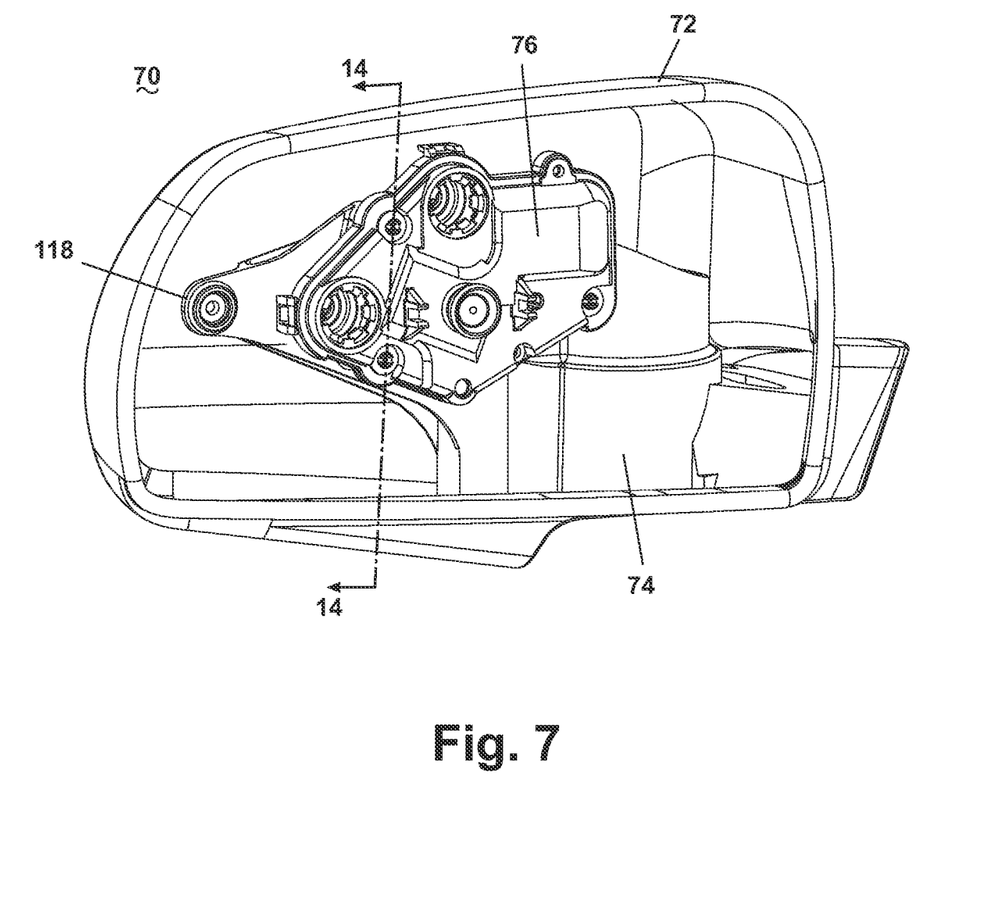
FIG. 7 is a perspective view of a second embodiment of the mirror assembly of FIG. 1 showing a mounting frame supporting a tilt actuator assembly mounted within a mirror housing.

FIGS. 7-14 illustrate an alternative embodiment of the mounting studs and their incorporation into a mirror assembly. As can be readily understood from comparing the mounting stud 24 shown in FIG. 5 with the mounting stud 94 shown in FIG. 14, the alternate embodiments of the mounting studs 24, 94 differ slightly in structure but operate in essentially the same manner. FIG. 7 shows a mirror assembly 70 comprising a mirror housing or shell 72 enclosing a mounting bracket 74 and an actuator assembly 76. Other elements of the mirror assembly 70, such as a reflective element assembly, a wire harness, and a mounting base, are omitted for purposes of clarity.

Figure 13:
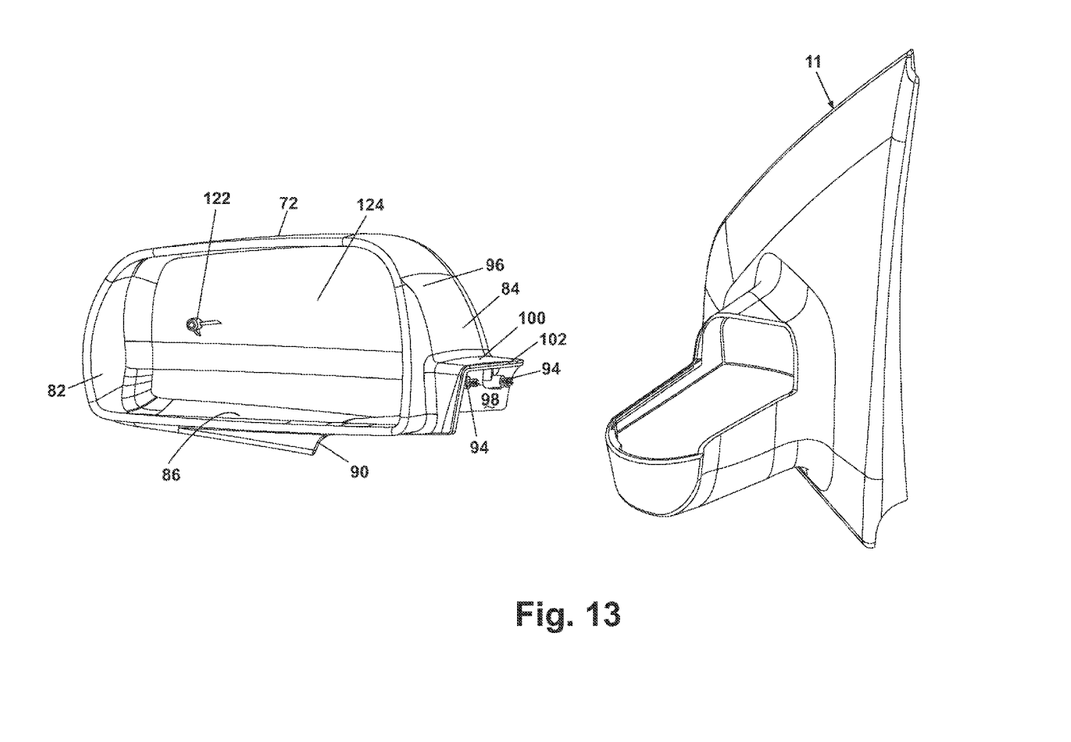
FIG. 13 is a perspective view of the mirror assembly shown in FIG. 7 with the tilt actuator assembly and the mounting frame removed for purposes of clarity.

As shown in FIG. 9, the shell 70 comprises a distal end 82 and a proximal end 84. A lower portion of the shell 70 comprises a shell floor 86 at the distal end 82 terminating in a generally U-shaped bracket opening edge 88 at the proximal end 84. The bracket opening edge 88 comprises a distal edge 90 adjacent the shell floor 86. The bracket opening edge 88 defines a floor opening 92 providing access to the interior of the shell 70. The shell 70 also comprises a front wall 124 extending from the distal end 82 to the proximal end 84. As shown in FIG. 13, a generally cylinder-shaped boss 122 extends rigidly inwardly from the front wall 124 near the distal end 82.

Figure 8:
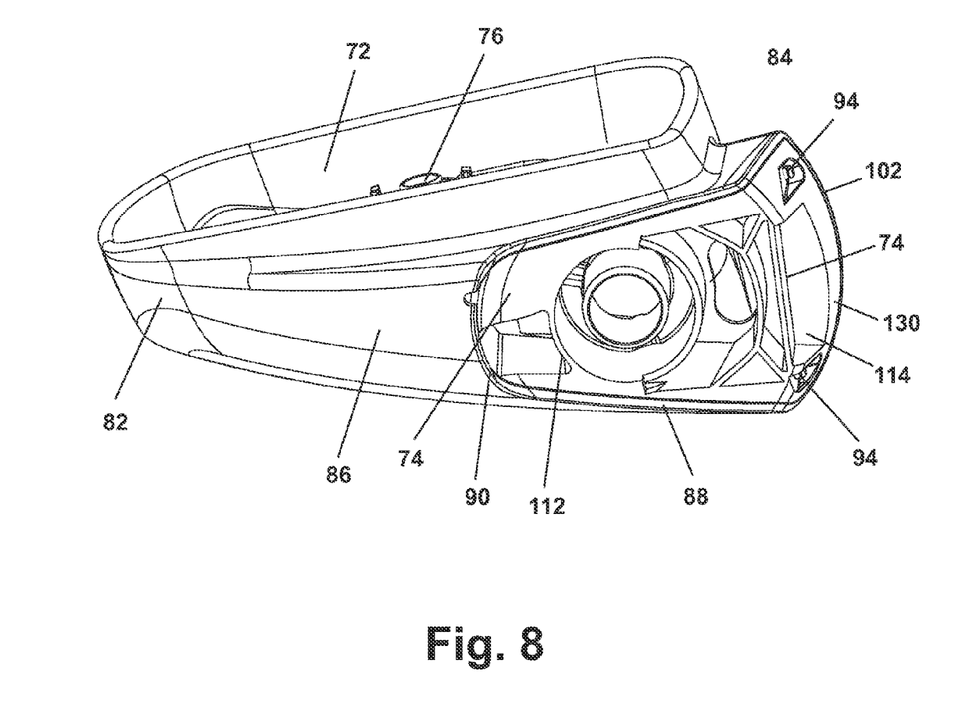
FIG. 8 is a perspective view of the underside of the mirror assembly shown in FIG. 7.

Referring to FIGS. 8, 10, and 13, the proximal end 84 comprises a proximal wall 96 terminating in an outwardly extending proximal lip 100, having an outwardly extending arcuate edge 102, to define a wall opening 98 in register with the floor opening 92. A pair of mounting studs 94, described hereinafter, extend outwardly from the wall opening 98 adjacent the proximal lip 100.

As shown in FIGS. 8-11, the mounting bracket 74 is an elongated, irregularly-shaped member having a distal end 104 and a proximal end 106. The distal end 104 comprises a somewhat plate-like actuator mounting frame 108 having a plurality of mounting studs 110 extending generally orthogonally therefrom and adapted for supporting the tilt actuator assembly 76. The actuator mounting frame 108 terminates in a circular frame detent 118 comprising a stop collar 120 adapted for slidable communication with the boss 122, as shown and in Figures 11 and 12. The proximal end 106 comprises an arcuate wall 114 adapted for register with the arcuate edge 102 and the wall opening 98, as shown in FIG. 8. The arcuate wall 114 comprises an end face 130 having a pair of apertures 132 adapted to receive the mounting studs 94 in a snap-fit communication, as hereinafter described.

Intermediate the actuator mounting frame 108 and the arcuate wall 114 is a pivot housing 112 adapted for receipt of a pivot assembly (not shown) for pivoting of the mirror assembly 70 between a first position folded against the vehicle and a second position extending outwardly from the vehicle. At a lower portion of the mounting bracket 74 intermediate the pivot housing 112 and the mounting frame 108, the mounting bracket 74 terminates in a downwardly depending shell lip 152 adapted for communication with the distal edge 90. As shown in FIG. 8, the shell lip 152 will be supported along the distal edge 90 when the mounting bracket 74 is inserted into the shell 72.

Figure 14:
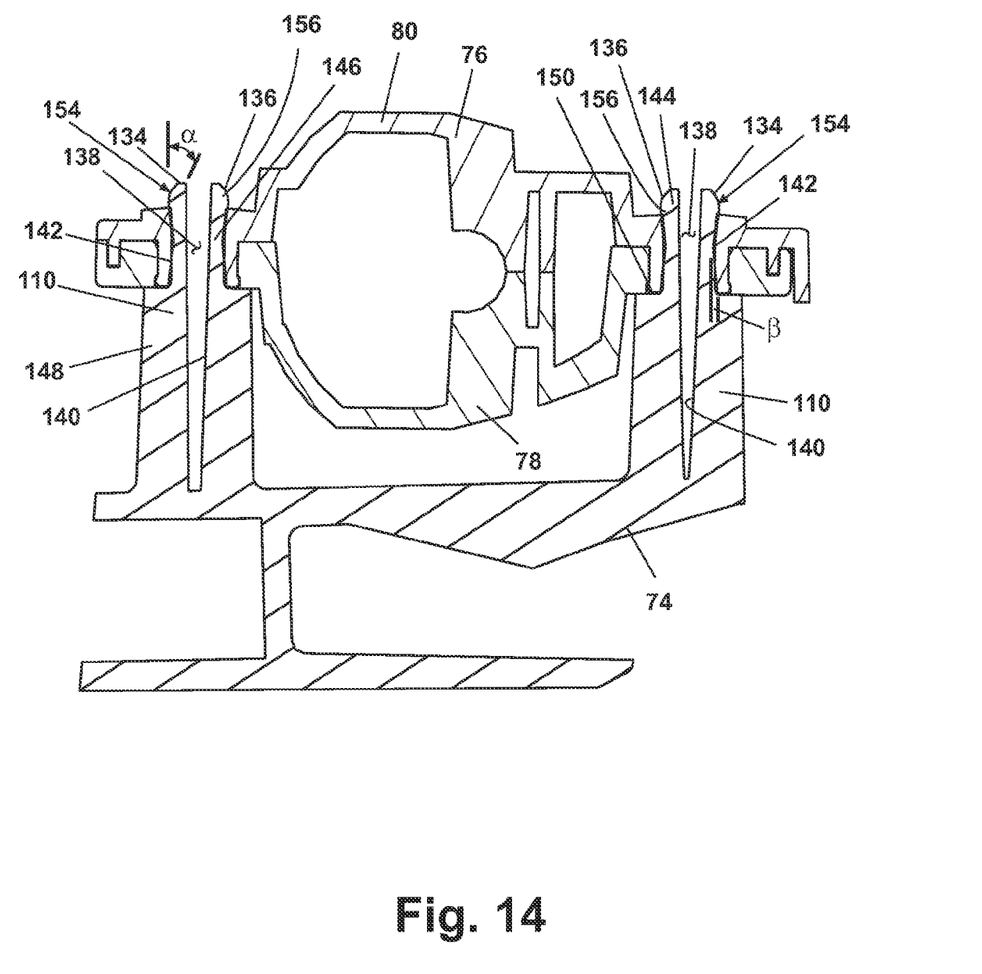
FIG. 14 is a sectional view taken along line 14-14 of FIG. 7.

FIG. 14 shows the structure of the mounting stud 110 attached to the mounting bracket 74 and supporting the tilt actuator assembly 76. It will be understood that the mounting stud 94 attached to the proximal end 84 of the shell 72 and the mounting stud 110 are identical in basic structure and operation. The mounting stud 110 comprises an annular support post 148 and an annular snap post 154, together defining a bore 138 therethrough having a bore surface 140. In a preferred embodiment, the bore 138 is uniformly tapered somewhat through the snap post 154 and the support post 148. The support post 148 extends from the mounting bracket 74 and is adapted with a shoulder 150 against which the tilt actuator assembly 76 is retained. The shoulder 150 transitions to the snap post 154, which has a diameter somewhat less than the diameter of the support post 148.

The snap post 154 comprises a neck 146 transitioning to a bulb end 156. The neck 146 is in the shape of a truncated cone. The bulb end 156 has a diameter somewhat greater than the diameter of the neck 146. The bulb end 156 transitions to a lead-in face 136 terminating and a boss and 134. In a preferred embodiment, the lead-in face 136 is inclined outwardly 45°, as shown in FIG. 14. In another embodiment, shown in FIG. 12, a slot 158 having a width approximately equal to the diameter of the bore 138 extends diametrically through the snap post 154 to separate the snap post 154 into two generally semicircular fingers.

As shown in FIGS. 9 and 10, the tilt actuator assembly 76 comprises an inner cover 78 and an outer cover 80 adapted for mating communication and enclosure of well-known components making up a tilt actuator, such as motors, clutches, jack screws, and the like (not shown for purposes of clarity). The inner cover 78 is provided with a plurality of apertures 126, and the outer cover 80 is provided with a plurality of apertures 128 in coaxial register with the apertures 126. When the outer cover 80 and the inner cover 78 are brought into operable communication to form the tilt actuator assembly 76, the apertures 126 will be in coaxial alignment with the apertures 128 and adapted for register with the mounting studs 110. As shown in FIG. 14, the apertures 128 define an aperture wall 142. In a preferred embodiment, the aperture wall 142 has an angle of inclination $\beta$ of approximately 10°. The neck 146 is similarly inclined for cooperative register with the aperture wall 142 when the bulb end 156 is inserted through the aperture 128.

The shell 72 and the mounting bracket 74 are preferably fabricated of a plastic or polymeric material having suitable strength and durability, particularly a relatively high modulus of elasticity, for the purposes described herein. As an example, a suitable material for the bracket 74 can comprise a glass-filled nylon, such as Capron 8267, and a suitable material for the shell 72 can comprise acetal, such as UltraForm 230. Other materials for the bracket 74 can comprise a polyester, such as Ultradur B4300, and for the shell 72 an ABS plastic, such as Cycolac X11. In a preferred fabrication process, the shell 72 and the bracket 74 are injection molded. A steel pin is used to form the bore 138. After completion of the injection process, the pin is removed, followed by ejection of the injection-molded part from the mold.

To assemble the tilt actuator assembly 76 to the mounting bracket 74 and the mounting bracket 74 into the shell 72, the bulb end 156 is inserted through the apertures 126-128 and 132, respectively. As the bulb end 156 moves through the apertures 126-128 and 132, the bulb end 156 will be compressed radially inwardly. The bulb end 156 will then emerge from the apertures 126-128 and 132 whereupon the bulb end 156 will expand radially outwardly to communicate with the apertures 126-128 and 132 in a snap-fit relationship. Furthermore, as the mounting studs 94 are inserted through the mounting bracket apertures 132 to secure the mounting bracket 74 into the shell 72, the boss 122 will be received in the frame detent 118, thereby providing additional resistance to movement of the mounting bracket 74 relative to the shell 72. In a preferred sequence, the mounting bracket 74 is first installed into the shell 72 followed by installation of the tilt actuator assembly 76 to the mounting bracket 74. The shell, mounting bracket, and tilt actuator assembly 72-76 will be quickly and accurately attached to each other without the necessity of installing separate fasteners. If the parts subsequently require separation, the tilt actuator assembly 76 can be readily removed from the mounting bracket 74, and the mounting bracket 74 can be readily removed from the shell 72, through the imposition of a sufficient pulling force. Should any of the snap posts 154 be separated from the support posts 148 during this operation, a conventional threaded fastener threaded into the bore 138 can be used to join the parts 72-76.

The use of the novel mounting studs rather than threaded fasteners provides a secure mounting of the tilt actuator to the mounting frame, and the mounting frame to the shell. With the mounting studs attached to or integrated into the mounting frame and the shell, the proper number of connections is always available. The snap-fit assembly of the mounting studs to the tilt actuator or the mounting frame obviates the careful attention to proper torque required with the use of threaded fasteners, thereby simplifying assembly while ensuring that an effective long-lasting assembly is made. While the invention has been specifically described in connection with certain specific embodiments thereof, it is to be understood that this is by way of illustration and not of limitation, and the scope of the appended claims should be construed as broadly as the prior art will permit.

We claim:

1. A vehicular mirror assembly comprising:
   a mounting frame adapted to be coupled to a vehicle;
   a mirror shell mounted to the mounting frame and comprising a rearwardly-facing opening;
   a reflective element mounted within the mirror shell in register with the rearwardly-facing opening;
   a tilt actuator mounted to the mounting frame, and to the reflective element for tiltably actuating the reflective element; and
   at least one connector joining at least one of (1) the mounting frame and the mirror shell, and (2) the tilt actuator and the mounting frame;
   wherein the at least one connector comprises:
   an elongated annular neck portion tapering gradually inwardly to a flared bulb end portion, the bulb end portion having a bulb diameter greater than a diameter of the neck portion, and
   a circular aperture having an aperture diameter adapted for slidable registry with the neck portion and smaller than the bulb diameter, to provide a snap-fit connection when the bulb end portion is inserted through the aperture to bring the neck portion into registry with the aperture, which securely retains the at least one of (1) the mounting frame to the mirror shell, and (2) the tilt actuator to the mounting frame.

2. The vehicular mirror assembly of claim 1 wherein the aperture is on at least one of the mounting frame, the mirror shell, and the tilt actuator and a stud is on at least one of the mounting frame, the mirror shell, and the tilt actuator, wherein the stud is adapted to be snap-fit within the aperture to securely mount the stud within the aperture.

3. The vehicular mirror assembly of claim 2 wherein the stud comprises the flared bulb end portion having the bulb diameter and the elongated annular neck portion having the neck diameter smaller than the bulb diameter, the elongated annular neck portion adapted for snap fit communication of the bulb end portion with the aperture.

4. The vehicular mirror assembly of claim 3 wherein the stud is integrally formed with the at least one of the mounting frame, the mirror shell, and the tilt actuator.

5. The vehicular mirror assembly of claim 4 wherein the flared bulb end portion comprises an annular face having an approximately 45° bevel.

6. The vehicular mirror assembly of claim 5 wherein the elongated annular neck portion comprises a truncated cone inclined approximately 10°.

7. The vehicular mirror assembly of claim 6 wherein the aperture comprises an aperture wall inclined approximately 10°.

8. The vehicular mirror assembly of claim 7 wherein the stud comprises a bore extending coaxially therethrough.

9. The vehicular mirror assembly of claim 1 wherein at least one of the mounting frame, the mirror shell, and the tilt actuator is made from a material selected from the group consisting of: glass-filled nylon, acetal, polyester, and ABS plastic.

10. A snap-fit assembly for interconnecting selected components of a vehicular mirror assembly, the components comprising a mirror housing, a mounting frame having at least one of a first mounting aperture having a first aperture diameter, and a tilt actuator assembly having at least one of a second mounting aperture having a second aperture diameter, the snap-fit assembly comprising:
   at least one of a first annular mounting stud comprising a flared first bulb end portion having a first bulb diameter and an elongated annular first neck portion tapering gradually inwardly to the flared first bulb end portion, the first neck portion and the first aperture being adapted for slidable registry of the first neck portion with the at least one of the first mounting aperture, and the first bulb end portion adapted for supporting communication with the mounting frame; and
   at least one of a second generally cylindrical mounting stud comprising a flared second bulb end portion having a second bulb diameter and an elongated annular second neck portion tapering gradually inwardly to the flared second bulb end portion, the second neck portion and the second aperture being adapted for slidable registry of the second neck portion with the at least one of the second mounting aperture, and the second bulb end portion adapted for supporting communication with the tilt actuator assembly.

11. The vehicular mirror assembly of claim 10 wherein the at least one of a first annular mounting stud is integrally attached to the mirror housing.

12. The vehicular mirror assembly of claim 10 wherein the at least one of a second annular mounting stud is integrally attached to the mounting frame.

13. The vehicular mirror assembly of claim 10 wherein the first bulb end portion of the at least one of a first annular mounting stud is rigidly attached to the mirror housing.

14. The vehicular mirror assembly of claim 10 wherein the second bulb end portion of the at least one of a second annular mounting stud is rigidly attached to the mounting frame.

15. The vehicular mirror assembly of claim 10 wherein at least one of the first bulb end portion and the second bulb end portion comprises an annular face having an approximately 45° bevel.

16. The vehicular mirror assembly of claim 10 wherein at least one of the first neck portion and the second neck portion comprises a truncated cone inclined approximately 10°.

17. The vehicular mirror assembly of claim 10 wherein one of the at least one of a first mounting aperture and the at least one of a second mounting aperture comprises an aperture wall inclined 10°.

18. The vehicular mirror assembly of claim 10 wherein one of the at least one of a first annular mounting stud and the at least one of a second annular mounting stud comprises a bore extending coaxially through the one of the at least one of a first annular mounting stud and the at least one of a second annular mounting stud.

19. The vehicular mirror assembly of claim 10 wherein the mounting bracket comprises a glass-filled nylon and the mirror housing comprises acetal.

20. The vehicular mirror assembly of claim 10 wherein the mounting bracket comprises a polyester and the mirror housing comprises an ABS plastic.

21. The vehicular mirror assembly of claim 10 wherein at least one of the mirror housing and the mounting bracket is injection molded.

22. A vehicular mirror assembly comprising:
a mirror housing adapted to enclose a mounting frame and a tilt actuator assembly; and having at least one of a first annular mounting stud;
the mounting frame enclosed within the mirror housing having at least one of a first mounting aperture having a first aperture diameter and at least one of a second annular mounting stud;
a tilt actuator assembly having at least one of a second mounting aperture having a second aperture diameter; and
wherein the at least one of a first annular mounting stud comprises a flared bulb end portion having a first bulb diameter and an elongated annular first neck portion tapering gradually inwardly to the flared bulb end portion, the first neck portion and the first aperture being adapted for slidable contact of the first neck portion with the at least one of the first mounting aperture, and the bulb end portion adapted for supporting communication with the mounting frame; and
wherein the at least one of a second annular mounting stud comprises a flared bulb end portion having a second bulb diameter and an elongated annular second neck portion tapering gradually inwardly to the flared bulb end portion, the second neck portion and the second aperture being adapted for slidable contact of the second neck portion with the at least one of the second mounting aperture, and the bulb end portion adapted for supporting communication with the tilt actuator assembly.

23. The vehicular mirror assembly of claim 22 wherein the at least one of a first annular mounting stud is integrally attached to the mirror housing.

24. The vehicular mirror assembly of claim 22 wherein the at least one of a second annular mounting stud is integrally attached to the mounting frame.

25. The vehicular mirror assembly of claim 22 wherein the first bulb end portion of the at least one of a first annular mounting stud is rigidly attached to the mirror housing.

26. The vehicular mirror assembly of claim 22 wherein the second bulb end portion of the at least one of a second annular mounting stud is rigidly attached to the mounting frame.

27. The vehicular mirror assembly of claim 26 wherein at least one of the first bulb end portion and the second bulb end portion comprises an annular face having an approximately 45° bevel.

28. The vehicular mirror assembly of claim 27 wherein at least one of the first neck portion and the second neck portion comprises a truncated cone inclined approximately 10°.

29. The vehicular mirror assembly of claim 22 wherein one of the at least one of a first mounting aperture and the at least one of a second mounting aperture comprises an aperture wall inclined approximately 10°.

30. The vehicular mirror assembly of claim 22 wherein one of the at least one of a first annular mounting stud and the at least one of a second annular mounting stud comprises a bore extending coaxially through the one of the at least one of a first annular mounting stud and the at least one of a second annular mounting stud.

31. The vehicular mirror assembly of claim 22 wherein the mounting bracket comprises a glass-filled nylon and the mirror housing comprises acetal.

32. The vehicular mirror assembly of claim 22 wherein the mounting bracket comprises a polyester and the mirror housing comprises an ABS plastic.

33. The vehicular mirror assembly of claim 22 wherein at least one of the mirror housing and the mounting bracket is injection molded.

* * * * *